United States Patent [19]

Tsukata

[11] 4,382,677
[45] May 10, 1983

[54] ORIGINAL DOCUMENT PRESSER

[75] Inventor: Masaharu Tsukata, Kawasaki, Japan

[73] Assignee: Canon Kabushiki Kaisha, Tokyo, Japan

[21] Appl. No.: 359,033

[22] Filed: Mar. 17, 1982

Related U.S. Application Data

[63] Continuation of Ser. No. 228,725, Jan. 27, 1981, abandoned.

[30] Foreign Application Priority Data

Jan. 31, 1980 [JP] Japan .................................. 55-12940
Jan. 31, 1980 [JP] Japan .................................. 55-12941

[51] Int. Cl.³ ...................... G03B 27/62; G03B 27/64
[52] U.S. Cl. ........................................ 355/76; 355/120
[58] Field of Search ................... 355/75, 76, 120, 128, 355/131, 133, 3 SH, 14 SH

[56] References Cited

U.S. PATENT DOCUMENTS 1,570,498  1/1926  Kalmanovitch ............... 355/120 X
2,225,530 12/1940  Campbell ......................... 355/120
3,644,039  2/1972  Boyer ............................ 355/120 X
3,829,215  8/1974  Smitzer et al. ................. 355/120 X
3,888,582  6/1975  Griswold ........................ 355/75 X

FOREIGN PATENT DOCUMENTS 666237  7/1963  Canada ............................. 355/120

Primary Examiner—Richard A. Wintercorn
Attorney, Agent, or Firm—Fitzpatrick, Cella, Harper & Scinto

[57] ABSTRACT

An original document presser includes a pressing member for pressing an original document on an original carriage, a driver for driving the pressing member for its opening and closing, a detector for detecting that the pressing member is in a predetermined position, and a control unit for controlling the motion of the pressing member. The control unit has a first signal generator and a second signal generator. In response to the start of an image forming operation, the first generator generates a signal to make the driver close the pressing member, and in response to the end of the image forming operation, the second generator generates a signal to make the driver open the pressing member. The control unit controls also the operation of the driver at the start of an image forming operation by means of an output signal from the detector.

16 Claims, 9 Drawing Figures

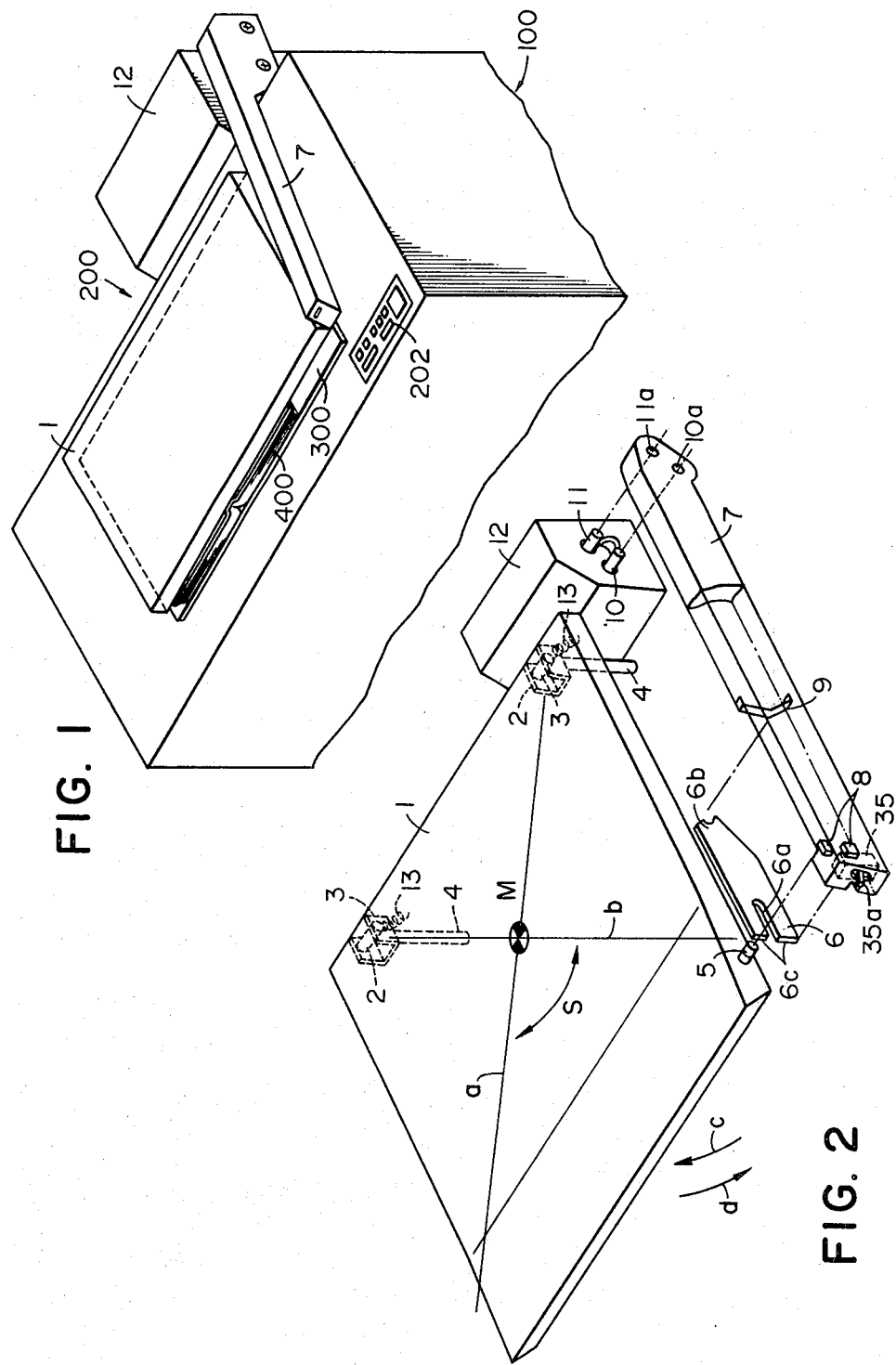

ORIGINAL DOCUMENT PRESSER

This is a continuation, of application Ser. No. 228,725, filed Jan. 27, 1981, now abandoned.

BACKGROUND OF THE INVENTION

1. Field of the Invention

The present invention relates to an original document presser adapted for image forming apparatus such as a copying machine, printer, recording apparatus, etc. In particular, the present invention relates to such original pressing apparatus in which an original document pressing member is automatically opened and closed.

2. Description of the Prior Art

A conventional image forming apparatus such as a copying machine usually includes a pressure plate for pressing a sheet original or a book original closely on an original table or carriage so as to prevent the original illuminating light from entering other portions besides the original document placed on the original table. Otherwise, portions other than the original may be undesirably copied in black which will degrade the quality of the copy then produced.

Recently, in order to improve the manoeuvrability of a copying machine, such a pressure plate has often been mounted in such a manner that the pressure plate is opened and closed automatically. However, such an automatically opening and closing pressure plate has some problems. When the pressure plate is moved down to its closed position on the original table or carriage at a high speed, the original once correctly placed on the original table is sometimes displaced by the impact of the pressure plate against the original. This is one of the important practical problems involved in the known automatically operable pressure plate.

SUMMARY OF THE INVENTION

Accordingly it is an object of the invention to provide an original document presser which can be operated to open and close the pressing member automatically and which is improved in respect of the above-mentioned problem.

It is another object of the invention to provide an original document presser in which the opening or closing motion of the original document pressing member is well controlled while detecting the position of the member at the start of an image forming operation.

It is a further object of the invention to provide an original document presser in which the moving speed of the original document pressing member is decreased in the course of its opening or closing movement.

BRIEF DESCRIPTION OF THE DRAWINGS

Other and further objects, features and advantages of the invention will appear more fully from the following description taken in connection with the accompanying drawings, in which:

FIG. 1 is a perspective view of a copying machine provided with an original document presser in accordance with the invention;

FIG. 2 is a detailed perspective view of the original document presser;

DESCRIPTION OF THE PREFERRED EMBODIMENTS

Figure 3A:
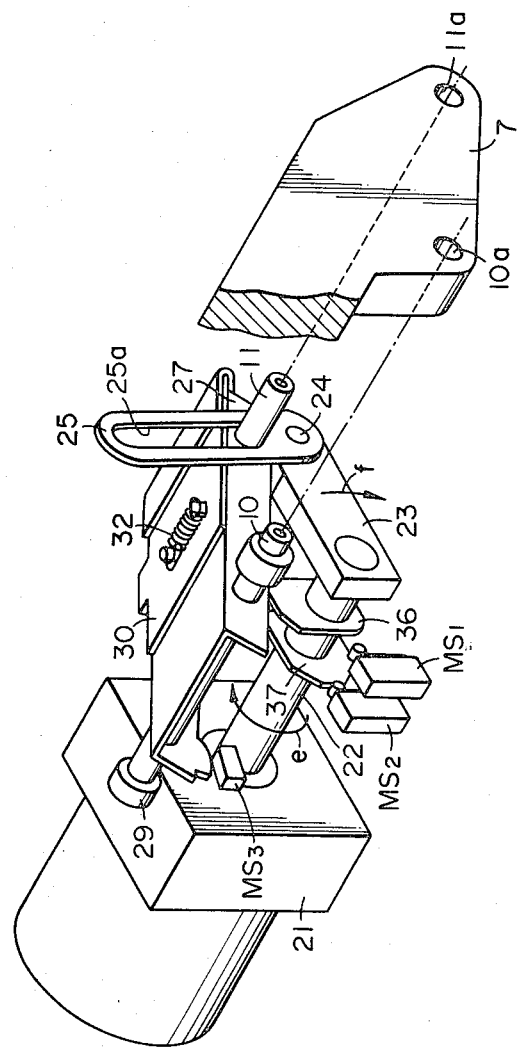
FIGS. 3A through 3C illustrate the manner of operation of the arm driving mechanism of the original document presser.

Referring first to FIG. 1 showing a copying machine in which the present invention is embodied, reference numeral 100 designates the main body of the copying machine and 200 designates an original document presser mounted on the copying machine as a preferred embodiment of the invention. The original document presser 200 comprises an original document pressing plate 1, an arm 7 and a driving unit 12. An original document table or carriage disposed on the machine body 100 has a glass surface 300 on which an original document 400 is placed. The original document 400 which is, in the shown case, a book original, is in close contact with the glass surface 300 under the pressure by the pressing plate 1. In this pressure-contacted position, the original 400 is copied. Numeral 202 is an operation panel.

The original document presser 200 is described in detail with reference to FIG. 2.

The pressing plate 1 is supported by a supporting member 3 for rotation about an axis 2. The supporting member 3 is fixed to a post 4 which is vertically slide movable along a guide pipe (not shown) provided on the machine body. As the supporting member 3 is vertically movable together with the post 4, the pressing plate 1 can follow the thickness of the original then placed on the original table. Therefore, when the original or the original table is a bulky document as in the case of the book original 400 in FIG. 1, the pressing plate 1 is positioned spaced from the glass surface 300 to accommodate itself to the thickness of the book original.

At one side of the pressing plate 1 there is provided an engaging member 5 through which the pressing plate is opened and closed by the arm 7. The engaging member 5 is fixed to the pressing plate at a point within area S defined by two lines a and b. The straight lines a and b extend from the posts 4 and 4 and intersect at the gravity center M of the pressing plate 1. Since the pressing plate 1 is mounted on the machine body through the posts 4 and 4 at the rear end of the plate and the front end of the plate is supported by the arm 7 through the engaging member 5, the pressing plate 1 can be opened and closed by the arm 7 relative to the machine body.

As later described in detail, the arm 7 is, at its rear end, mounted on shafts 10 and 11 arranged in the vicinity of the driving shaft of the above supporting member 3. The arm is connected with the driving unit 12 through the shafts 10 and 11 so that the arm 7 can be rotated by the driving unit in the directions of arrows c and d. The rotation of the arm 7 cannot be transmitted to the posts 4, 4. It is transmitted only to the engaging member 5 at the front part of the pressing plate. Since the engaging member 5 is in engagement with the arm 7 within the above defined area S, the pressing plate rotates about the axis 2 when the arm rotates in the direction of arrow c or d. Thus, with the rotation of the arm 7 in the direction of arrow c or d the pressing plate 1 is driven into rotation in the direction c or d without the post 4 and the rear end of the pressing plate 1 being moved upwardly at the same time.

Details of the driving unit 12 are described hereinafter with reference to FIGS. 3A through 3C.

Figure 3B:
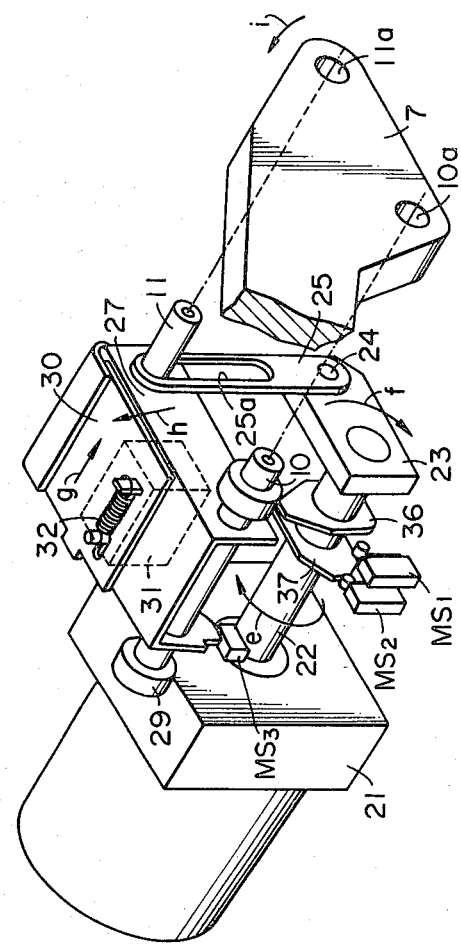
Figure 3C:
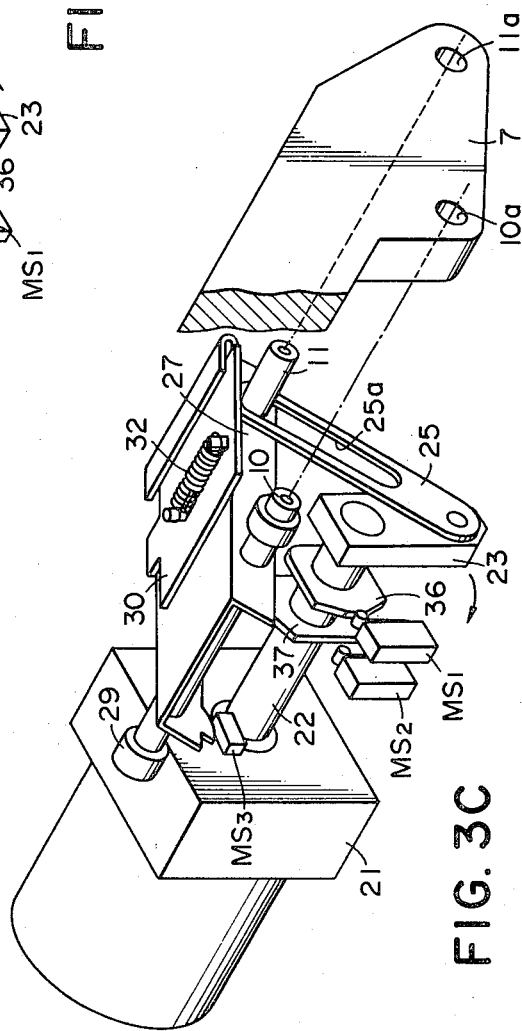

As shown in FIG. 3A, the rear end part of the arm 7 has slots 10a and 11a into which the arm shaft 10 and the arm driving shaft 11 are fitted to connect the arm to the driving unit 12. The two shafts 10 and 11 are connected with the internal mechanism of the driving unit 12 so that the arm 7 can be rotated in the directions of c and d through the shafts 10 and 11.

The driving unit 12 includes a motor 21 having an output shaft 22 to which a crank arm 23 is fixed. The other end of the crank arm 23 is rotatably connected with one end of a crank line 25 through a dowel 24. At the other end of the crank link 25 there is formed an elongate slot 25a in which the arm driving shaft 11 is engaged. The arm driving shaft 11 is supported by an angle member 27 which is swing movable about the arm shaft 10. The arm shaft 10 is supported by a bearing 29 mounted on one side plate of the machine body (not shown).

The manner of operation of the above-described original presser will be discussed.

FIG. 3A shows the original presser in its home position. In this position, the original pressing plate 1 is normally in an upward rotated position, that is, in its opened position. In this home position, the crank arm 23 is at its upper dead point with the dowel 24 being in the uppermost position as a waiting position. As a result, the crank link 25 is also in its uppermost position with the lower end of the elongate slot 25a being in engagement with the arm driving shaft 11. In this position, the operator is allowed to manually move the arm 7 within a range between the opened position and the closed position. During such manual operation, the arm driving shaft 11 moves upward along the elongate slot 25a. In other words, so long as the crank arm 23 is at its upper dead point, manual operation of the pressing plate 1 is possible within the length of the elongate slot 25a. Therefore, the range within which the pressing plate 1 can be moved manually from the above home position may be extended to that ranging from fully opened position to fully closed position of the pressing plate by suitably selecting the size of the elongate slot 25a.

Automatic closing of the pressing plate 1 from the above home position is initiated by means of a suitable closing signal which may be a copy signal coming from the copying machine.

In response to the signal, the motor 21 starts rotating and therefore its output shaft 22 rotates in the direction of arrow e in FIG. 3A. With the rotation of the output shaft 22 in the direction e, the crank arm 23 rotates in the direction of arrow f from the upper dead point. Consequently, the crank link 25 gradually moves downward and passes over the level of a slide plate 30 as described hereinafter. Finally, the crank arm 23 reaches its lower dead point and the arm driving shaft 11 abuts against the upper end of the elongate slot 25a as seen in FIG. 3B. In this position shown in FIG. 3B, a solenoid 31 is actuated to move the slide plate 30 along the upper surface of the angle member 27 in the direction of arrow g. Thus, the slide plate 30 overhangs the top of the crank link 25 (FIG. 3C). Further rotation of the crank arm 23 from the lower dead point causes the arm driving shaft 11 to follow the movement of the crank link 25 while maintaining its engagement with the upper end of the elongate slot 25a so as to close the pressing plate 1. More particularly, when the crank arm 23 further rotates passing through its lower dead point, the crank link 25 tends to move upward again. However, the slide plate 30 overhanging the top of the crank link inhibits this upward movement of the crank link 25. Consequently, the angle member 27 is rotated about the arm shaft 10 in the direction of arrow h by the force of the crank link now tending to move upward. With the rotation of the angle member 27, the arm driving shaft 11 is also rotated in the direction of arrow h. Therefore, the arm 7 having the slot 11a connected with the shaft 11 is rotated about the shaft 10 in the other slot 10a in the direction of arrow i to close the pressing plate 1.

Even when the current to the solenoid 31 is cut off immediately after the start of above closing motion, the slide plate 30 cannot be returned to its starting position because of the pressure-contact between the slide plate and the top of the crank link 25. The slide plate 30 is allowed to return to its starting position under the action of a return spring 32 only when the pressing plate 1 enters the falling angle area after passing through the self-standing angle area thereby releasing the slide plate from the contact pressure by the top of the crank link. After entering the falling angle area, the pressing plate continues closing with the arm driving shaft 11 being in contact with the upper end of the elongate slot 25a. When the pressing plate 1 reaches the original table surface 300, the motor 21 stops rotating and the arm driving shaft 11 remains engaged with the upper end of the elongate slot 25a. If a bulky original is on the original table, the pressing plate stops its closing movement at the time point when the pressing plate comes into contact with the document. The output shaft 22 completes its one revolution and then stops. Again, in this closed position, the operator is allowed to manually open the pressing plate 1.

Automatic opening of the pressing plate 1 is initiated by energizing the motor in the direction of arrow e. With the start of rotation of the motor 21 in the direction of arrow e from the above waiting position in which the crank arm is at its upper dead point and a manual operation of the pressing plate is possible, the crank arm 23 starts rotating in the direction of arrow f. The crank link 25 also rotates in the direction f with the arm driving shaft 11 being engaged with the upper end of the elongate slot 25a. Since, as previously described, the arm 7 is connected with the arm driving shaft 11 and arm shaft 10 through the slots 11a and 10a respectively, the crank link 25 now moving in the direction f together with the arm driving the shaft 11 causes the arm 7 to rotate about the slot 10a in the direction of arrow e so as to open the pressing plate 1. When the crank arm 23 reaches its lower dead point, the pressing plate arrives at the fully opened position. In this position, the pressing plate 1 is self-standing under the action of a spring mechanism 13 provided within the supporting member 3. The crank arm 23 continues further rotating until it reaches the upper dead point. At the upper dead point, the crank arm 23 stops. As previously mentioned, the operator is allowed to manually operate the pressing plate 1 also in this position. The spring mechanism 13 mentioned above is disposed between the pressing plate 1 and the body of copying machine.

To perform the above operation of the original presser it is required to rotate the motor 21 correctly one revolution and also to actuate the solenoid 31 at a suitable point during the revolution of the motor.

Figure 4:
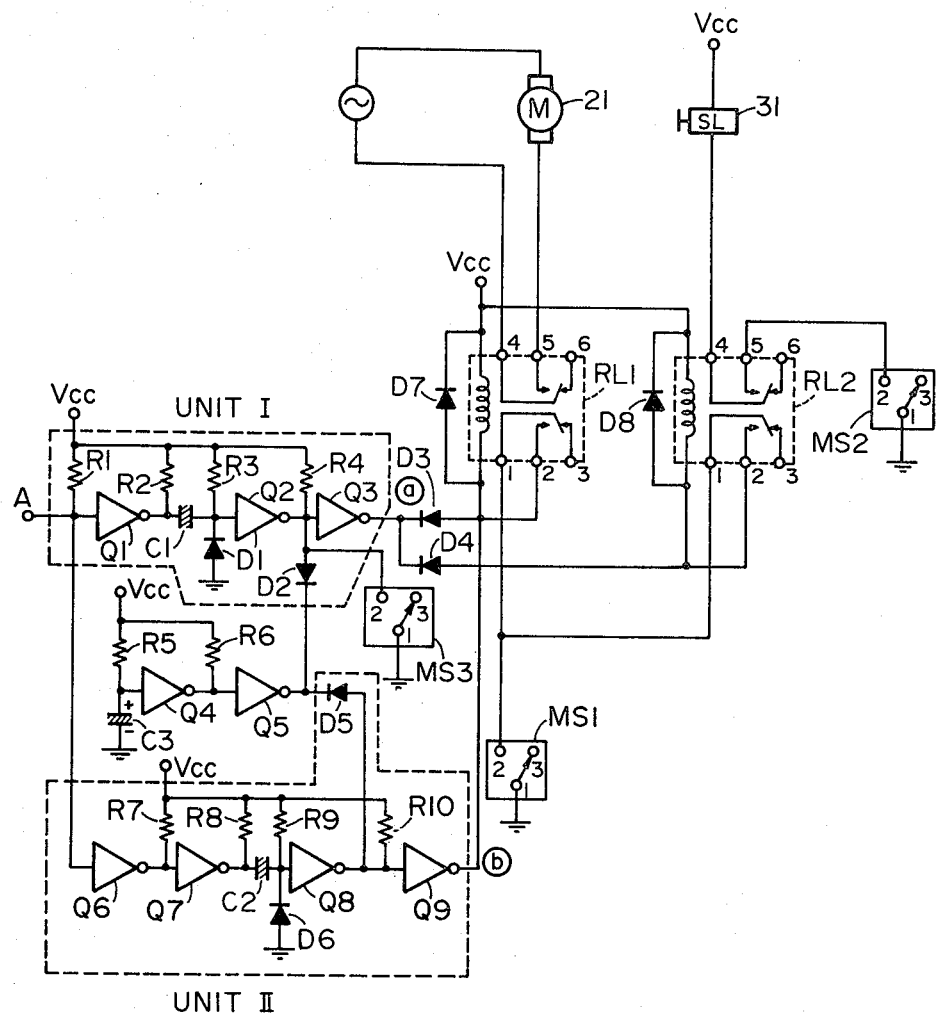
FIG. 4 is a schematic circuit diagram of a control for controlling the opening and closing motion of the original document pressing member in the original document presser.

FIG. 4 shows a specific circuit form of the control unit for controlling the operation of the above-described original presser.

In FIG. 4, reference characters $Q_1$–$Q_9$ are hammer drivers composed of transistors, diodes or the like. Each of the hammer drivers produces "L" when the input to it is "H", and produces "H" when the input is "L". $R_1$–$F_{10}$ are resistors, $C_1$–$C_3$ are capacitors and $D_1$–$D_8$ are diodes. M is a motor which corresponds to the motor 21 shown in FIG. 3 and SL is a solenoid corresponding to the solenoid 31 shown in FIG. 3. $MS_1$ is a microswitch with which a cam 36 as later described comes into contact. When the cam 36 is in contact with the microswitch $MS_1$, the latter is made conductive between its terminals 1 and 3 whereas when the cam is out of contact with the microswitch, the latter is made conductive between its terminals 1 and 2. $MS_2$ is also a microswitch with which another cam 37 comes into contact. When the cam is in contact with the microswitch $MS_2$, the latter is made conductive between its terminals 1 and 2 whereas, when out of contact, the microswitch is made conductive between its terminals 1 and 3. $MS_3$ is a microswitch for detecting the position of the pressing plate 1. When the pressing plate is in its opened position, the microswitch $MS_3$ is made conductive between its terminals 1 and 3 whereas when the pressing plate is in its closed position, the microswitch is made conductive between its terminals 1 and 2. $RL_1$ is a relay for driving the motor M and $RL_2$ is a relay for driving the solenoid SL.

Figure 5:
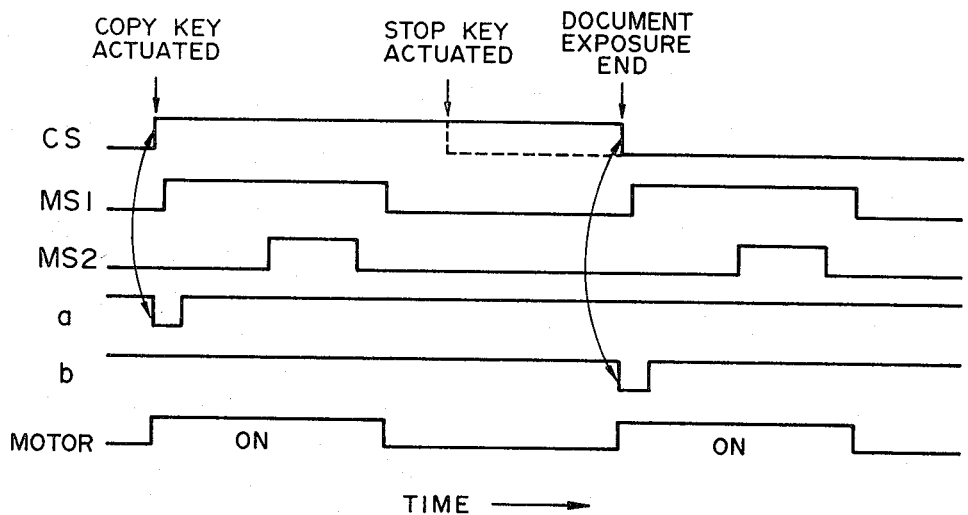
FIG. 5 is a timing chart useful for understanding the control circuit.

FIG. 5 shows a timing chart of the above control circuit.

In the timing chart, CS is a signal which rises at the start of an image forming operation and falls at the end of the image forming operation. This signal CS is issued from the copying machine. In the shown embodiment, the signal CS rises when the copy key is actuated and it falls at the end of document exposure. The signal may be formed also in such a manner that it falls in timing with the return of a scanning system (such as moving original table or moving optical system) after the end of scanning. The timing can be obtained from turn-on of the exposure lamp or by means of a process timing signal for returning the scanning system. Also, the timing can be obtained from a switch provided in the scanning path for such scanning system.

The manner of operation of the above control circuit will be described below.

An actuation of the copy key in the opened position of the pressing plate 1 causes signal CS to rise to H. This signal CS is introduced into the unit I from terminal A and therefore the output from hammer driver $Q_1$ becomes "L". Consequently, the capacitor $C_1$ is charged through resistor $R_3$. Hammer driver $Q_2$ continues producing "H" until the voltage charge on the capacitor $C_1$ reaches a certain determined level. As soon as the charged voltage reaches that level, the output from $Q_2$ changes to "L" again. Therefore, there is issued from hammer driver $Q_3$ a simple pulse whose level is turned to "L" temporarily for a certain time period as shown at a in FIG. 5. This pulse drives the relays $RL_1$ and $RL_2$ to make them conductive between terminals 1 and 2 and between terminals 4 and 5 respectively. Thereby AC voltage is applied to the motor M which now starts rotating.

On the shaft of the motor M there are mounted two cams 36 and 37. When the motor M is at a stop, the microswitch $MS_1$ is in contact with the cam 36 and therefore it is conductive between terminals 1 and 3. The cam 37 is out of contact with the microswitch $MS_2$ and therefore the microswitch is conductive between its terminals 1 and 3.

At the start of rotation of the motor M, the microswitch $MS_1$ is first released from contact with the cam 36 so that the step between terminals 1 and 2 is made conductive. This makes the output from the unit I "H". Relays $RL_1$ and $RL_2$ are kept driven to maintain the rotation of the motor M. After about a half revolution of the motor M, the cam 37 comes into contact with microswitch $MS_2$ so that it is made conductive between its terminals 1 and 2. Thereby the solenoid SL is driven so as to initiate the closing motion of the pressing plate 1 described above. After the pressing plate 1 has passed over the self-standing angle area, the microswitch $MS_2$ is released from the contact with the cam 37 and the solenoid SL is turned off. From this position, the pressing plate 1 continues its closing motion with the rotation of the motor M. Some time afterwards the cam 36 comes into contact with microswitch $MS_1$ so that the step between terminals 1 and 2 of the microswitch $MS_1$ is made nonconductive and the relays $RL_1$ and $RL_2$ are deenergized. Thus, the motor stops rotating. In this manner, the pressing plate 1 reaches the original table. In this connection, it should be noted that the pressing plate 1 has to reach the original table before the beginning of movement of the original table or movement of the optical system for scanning, namely before the beginning of original document exposure.

During the time of the pressing plate 1 being in its closed position, the microswitch $MS_2$ remains conductive between its terminals 1 and 2. Therefore, in this closed position, the hammer driver $Q_3$ in the unit I has an input of ground level and relays $RL_1$ and $RL_2$ cannot be driven by keying of the copy button. Consequently, the motor M and solenoid SL remain out of operation and therefore the pressing plate 1 can hold its closed position.

The pressing plate 1 is opened in the following manner:

In response to the end of original exposure the signal CS rises as shown in FIG. 5. By this rise of the signal CS the output from hammer driver $Q_6$ in the unit II of the control circuit is turned to "H" which makes the hammer driver $Q_7$ put out "L". Therefore, the capacitor $C_2$ is charged through resistor $R_9$. Hammer driver $Q_8$ continues putting out "H" until the voltage of the charged condenser reaches a certain determined level. When the voltage has reached the level, the output from $Q_8$ becomes "L" again. As a result, hammer driver $Q_5$ issues a simple pulse whose level is turned to "L" temporarily for a certain short time as seen in FIG. 5 (b). By this pulse the relay $RL_1$ is driven and the motor M starts rotating. However, since relay $RL_2$ is not driven by it, the solenoid SL remains undriven even when the cam 37 comes into contact with microswitch $MS_2$. Accordingly, the pressing plate 1 is opened in the manner previously described. When the cam 36 comes into contact with microswitch $MS_1$, the motor M stops and the opening motion of the pressing plate 1 comes to an end.

The above opening motion of the pressing plate 1 is initiated only when a preset number of copies have been made completely. The opening operation of the pressing plate does not occur every time one copying cycle comes to end. As suggested by the broken line in FIG. 5, the signal CS falls at the issuance of a stop instruction for cancellation which may be, for example, a keying-on of the stop key on the copying machine. In response to the fall of the signal CS the opening operation of the pressing plate 1 is initiated. By any other stop instruction than the stop instruction for cancellation, no operation for opening the pressing plate 1 is initiated. For example, stop instructions caused by such signals informing of "interruption of continuous copying", "jamming", "no paper available" or "no toner available" cannot initiate the opening motion of the pressing plate 1. In these cases, the signal CS is gated by such signals as mentioned above and the interrupted signal CS is held to keep the pressing plate 1 in its closed position.

The part of circuit constituted of hammer drivers $Q_4$ and $Q_5$ serves to prevent any malfunction of the control which may be caused by noise at the time of engagement throw-in of the power source.

At the engagement of the power source, the input to hammer driver $Q_4$ is at ground level and therefore the output from $Q_5$ is "L". The inputs to the hammer drivers $Q_3$ and $Q_9$ are forcedly turned to "L" through diodes $D_2$ and $D_5$ to inhibit the operation of the units I and II of the control circuit at the time of engagement of the power source. Thereafter, the condenser $C_3$ is charged through resistor $R_5$. After the charged voltage has become higher than the threshold level for hammer driver $Q_4$, the output from the hammer driver $Q_5$ turns to "H". Thus, the circuit units I and II are made operable. In this manner, to prevent any malfunction of the control circuit die to noise at the engagement of the power source, the control circuit is inhibited from operating from a certain time long after the engagement thereof.

As understood from the foregoing, the above embodiment is so constructed as to keep the control circuit inoperative so long as the pressing plate is in its closed position at the start of an image forming operation and also keep it unable to operate for a certain time long after the engagement of the power source. This embodiment has the effect of preventing any possible malfunction of the apparatus and assures a high efficiency of copying operation.

As a modification of the above embodiment, a locking member such as a plunger may be provided to inhibit the opening operation of the pressing plate during image formation. In this case, the plunger may be controlled by using a flip-flop. For example, the flip-flop is set by an actuation of copy key and the plunger is driven by its output. By an end signal informing of the completion of a desired number of exposures the flip-flop is reset. It is preferable to unlock the pressing plate by an interruption signal such as "stop key on", "jamming", "no paper available", "no toner available" or the like.

In a pressing plate operating mechanism as described above, the solenoid SL is turned off immediately after the pressing plate 1 has passed over the self-standing angle area. Then, the pressing plate 1 becomes free. Therefore, immediately after turn-off of the solenoid SL, the velocity of the falling pressing plate is somewhat reduced. However, in the movement of the pressing plate subsequent to the speeddown, the moving velocity of the falling pressing plate is gradually accelerated by its own weight. As a result there is produced a space between the arm driving shaft and the crack link 25 which is being driven by the motor rotating at a uniform speed. Because of such clearance the pressing plate 1 moves down to the original table while being accelerated by gravity. When the pressing plate reaches the original table, a considerable amount of shock is applied to the original table by the accelerated pressing plate. In case that the original document placed on the table is a sheet original, such a great shock may bring forth the problem that the sheet original is displaced from the correct position previously set for the original. In accordance with a preferred embodiment of the invention, this problem is eliminated by reducing the velocity of the falling pressing plate by applying a DC braking action to the motor M immediately before the arrival of the pressing plate at the original table.

Figure 6:
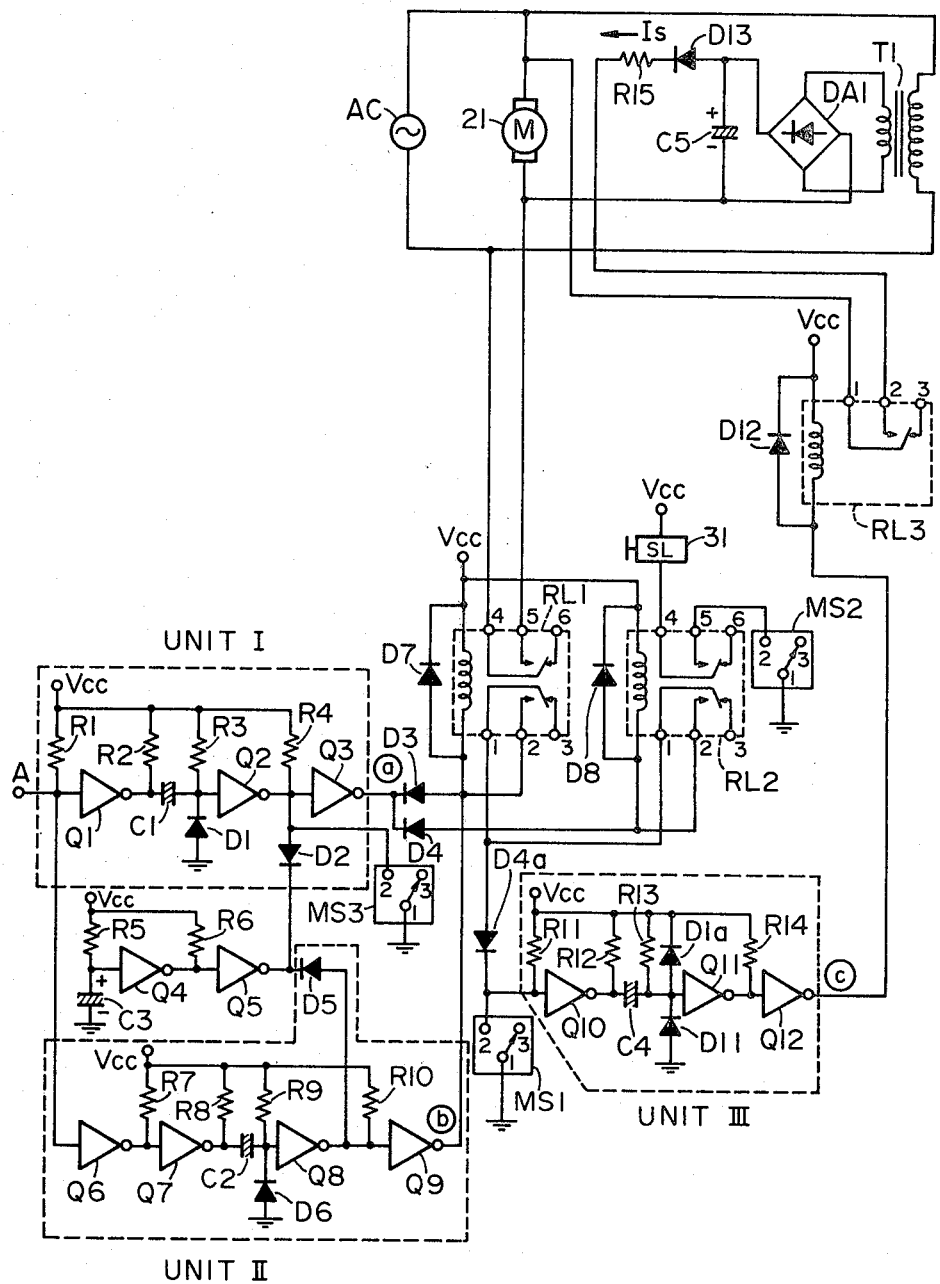
FIG. 6 is a schematic circuit diagram of a control for controlling the moving speed of the original document pressing member.

FIG. 6 shows a specific form of the control circuit useful for such embodiment.

In FIG. 6, like characters to FIG. 4 represent the same or corresponding elements. $Q_{10}$ to $Q_{12}$ are hammer drivers composed of transistors, diodes etc. Each hammer driver is so formed as to produce an output "L" when the input to the same is "H" and an output "H" when the input is "L". $R_{11}$ to $R_{15}$ are resistors, $C_4$ to $C_5$ are capacitors, $D_9$ to $D_{13}$ are diodes and $T_1$ is a transformer. $DA_1$ designates a diode bridge for rectifying AC voltage and $RL_3$ is a relay for applying a DC brake to the motor M.

Figure 7:
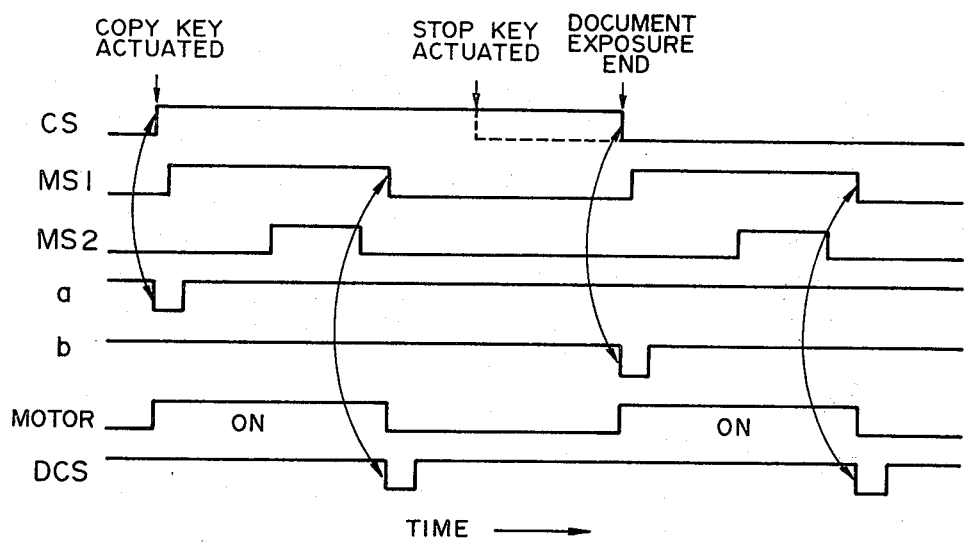
FIG. 7 is a timing chart useful for understanding the control circuit.

The manner of operation of the control circuit shown in FIG. 6 is as follows:

At a point before the arrival of the pressing plate 1 at the original table, the cam 36 comes into contact with the microswitch $MS_1$ again and makes the latter conductive between its terminals 1 and 3. Thereby AC voltage input to the motor M is cut off and the input to the unit III of the control circuit is turned to the "H" level. Since the unit III is essentially the same as the unit I in arrangement, the input to driver $Q_{10}$ becomes "H" and its output becomes "L". Therefore, the capacitor $C_4$ is charged through resistor $R_{13}$. The output from hammer driver $Q_{11}$ continues to be "H" until the voltage charge on the capacitor reaches a certain determined level. When the voltage reaches the level, that output from $Q_{11}$ becomes "L" again so that hammer driver $Q_{12}$ issues a simple pulse as DCS shown in FIG. 7. The relay $RL_3$ is driven by this pulse DCS.

In the shown embodiment, transformer $T_1$, diode $DA_1$ and capacitor $C_5$ constitute a circuit for obtaining DC voltage. When the relay $RL_3$ is driven, the state between its terminals 1 and 2 is made conductive. Therefore, a brake current Is flows to the motor M to apply a DC brake to the motor. Thereby the rotational speed of the motor is gradually decreased so as to reduce the velocity of the falling pressing plate 1 which is being accelerated by gravity at that time. When the pressing plate 1 has reached the original table, the level of the signal DCS is again returned to "H" and the relay $RL_3$ is turned off. This operation is also carried out in the same manner when the pressing plate 1 is opened.

The brake current Is can be set to an optimum value by suitably selecting the resistor $R_{15}$. Diode $D_{13}$ serves to prevent any back current which may be caused, for example, by arc discharge at relay contacts.

Application of a DC brake to the driving source described above shows only one example of various useful methods to reduce the moving speed of the pressing plate in the course of an opening operation. The desired reduction of speed in the course of movement of the pressing plate may be attained also by employing a brake shoe acting on the motor, an eccentric cam provided between the motor and the associated mechanism or a clutch provided between the motor and the associated mechanism to reduce the speed of the moving pressing plate in a fashion of semi-clutch control.

All of the above-mentioned measures are effective for preventing a sheet original on the original table from being displaced by the shock of the pressing plate against the original table. Among them, the first-mentioned speed reduction method employing a DC brake has an advantage that a very great braking torque can be obtained using a relatively simple and inexpensive circuit. Therefore it is particularly useful for such type of apparatus in which the pressing plate is automatically opened and closed by a driving motor and furthermore the closing operation of the pressing plate is performed by its own weight.

While the invention has been particularly shown and described with reference to preferred embodiments thereof, it will be understood by those skilled in the art that the foregoing and other changes in form and details can be made therein without departing from the spirit and scope of the invention.

What I claim is:

1. An original document pressing apparatus comprising:
    a pressing member for pressing an original document on an original document carriage;
    driving means for opening and closing said pressing member;
    detection means for detecting when said pressing member is in a predetermined position; and
    control means including a first signal generating circuit and a second signal generating circuit to make said driving means operate to close said pressing member in response to an output signal from said first signal generating circuit at the start of an image forming operation and to make said driving means operate to open said pressing member in response to an output signal from said second signal generating circuit at the end of an image forming operation while controlling also the operation of said driving means at the start of the image forming operation by means of an output from said detection means.

2. An apparatus according to claim 1 wherein said detection means detects when said pressing member is in its closed position and in pressure-contact with said original carriage.

3. An apparatus according to claim 1 wherein said control means inhibits a closing motion of said pressing member by said driving means at the start of an image forming operation when said detection means has detected that said pressing member is present on the original carriage.

4. An original document pressing apparatus comprising:
    a pressing member for pressing an original document on an original document carriage;
    driving means for opening and closing said pressing member; and
    control means including a first signal generating circuit and a second signal generating circuit to make said driving means operate to close said pressing member in response to an output signal from said first signal generating circuit at the start of an image forming operation 1 and to make said driving means operate to open said pressing member in response to an output signal from said second signal generating circuit at the end of image forming operation wherein said control means inhibits the operation for opening said pressing member when said image forming operation is under interruption.

5. An apparatus according to claim 1 wherein said interruption of image forming operation is caused by jamming, paper shortage, toner shortage or the like.

6. Original document pressing apparatus comprising:
    a pressing member for pressing an original document on an original document carriage;
    driving means for opening and closing said pressing member;
    control means including a first signal generating circuit and a second signal generating circuit to make said driving means operate to close said pressing member in response to an output signal from said first signal generating circuit at the start of an image forming operation and to make said driving means operate to open said pressing member in response to an output signal from said second signal generating circuit at the end of said image forming operation; and
    means for holding said driving means inoperative for a certain time period after engagement of a power source.

7. An original document pressing apparatus comprising:
    an original pressing member for pressing an original document on an original document carriage;
    driving means for opening and closing said pressing member;
    control means including a first signal generating circuit and a second signal generating circuit to make said driving means operate to close said pressing member in response to an output signal from said first signal generating circuit at the start of an image forming operation and to make said driving means operate to open said pressing member in response to an output signal from said second signal generating circuit at the end of said image forming operation; and
    speed reduction means for reducing the speed of said pressing member in the course of its opening or closing motion.

8. An apparatus according to claim 1 wherein said speed reduction means applies a DC brake to said driving means in a predetermined timing.

9. An original document pressing apparatus comprising:
    a pressing member for pressing an original document on an original document carriage;
    driving means for opening or closing said pressing member;
    detection means for detecting when said pressing member is in a predetermined position; and
    control means, responsive to the start or stop of an image forming operation, for causing said pressing means to be opened or closed by said driving means, and for controlling said driving means with an output of said detecting means at the time of image formation.

10. An apparatus according to claim 9, wherein said detection means detects when said pressing member is in its closed position and in pressure-contact with the original carriage.

11. An apparatus according to claim 10, wherein said control means inhibits a closing motion of said pressing member by said driving means at the start of an image forming operation when said detection means has detected that said pressing member is present on the original carriage.

12. An original document pressing apparatus comprising:
a pressing member for pressing an original document on an original document carriage;
driving means for opening said pressing member; and
control means responsive to an interruption of an image forming operation for causing said pressing member to be opened by said driving means, wherein said control means inhibits operation for opening said pressing member when said image forming operation is under interruption.

13. An apparatus according to claim 12, wherein said interruption of an image forming operation is caused by jamming, paper shortage, toner shortage or the like.

14. An original document pressing apparatus comprising:
a pressing member for pressing an original document member on an original document carriage;
driving means for opening or closing said pressing member;
control means responsive to the start or stop of an image forming operation for causing said pressing member to be opened or closed by said driving means; and
means for holding said driving means inoperative for a certain time long after the throw-in of the power source.

15. An original document pressing apparatus comprising:
an original pressing member for pressing an original document on an original document carriage;
driving means for opening or closing said pressing member;
control means responsive to termination of an image forming operation for causing said pressing member to be opened or closed by said driving means; and
speed reduction means for reducing the moving speed of said pressing member in the course of its opening or closing motion.

16. An apparatus according to claim 15, wherein said speed reduction means applies a DC brake to said driving means in a predetermined timing.

* * * * *

UNITED STATES PATENT AND TRADEMARK OFFICE
CERTIFICATE OF CORRECTION

PATENT NO. : 4,382,677
DATED : May 10, 1983
INVENTOR(S) : MASAHARU TSUKATA

It is certified that error appears in the above-identified patent and that said Letters Patent is hereby corrected as shown below:

Column 7, line 19, delete "throw-in";
　　　　　　line 66, "crack" should read --crank--.

Column 8, line 40, delete "the" (second occurrence) and insert --that--; delete "that" after "level" and insert --the--;
　　　　　　line 64, insert --or closing-- after "opening".

Column 9, line 48, "claim 1" should read --claim 2--;
　　　　　　line 65, delete "1" after "operation".

Column 10, line 4, "claim 1" should read --claim 4--;
　　　　　　　line 44, "claim 1" should read --claim 7--.

Signed and Sealed this

Fifteenth Day of November 1983

[SEAL]

Attest:

GERALD J. MOSSINGHOFF

Attesting Officer

Commissioner of Patents and Trademarks